(12) United States Patent
Branch et al.

(10) Patent No.: US 6,666,484 B1
(45) Date of Patent: Dec. 23, 2003

(54) PIVOTING TYPE LATCH FOR REMOVABLE ELECTRONIC DEVICES

(75) Inventors: Scott Michael Branch, Rochester, MN (US); Leland L. Day, Rochester, MN (US); David Peter Gaio, Rochester, MN (US); Michael Francis Hanley, Rochester, MN (US); William K. Hogan, Rochester, MN (US)

(73) Assignee: JDS Uniphase Corporation, San Jose, CA (US)

( * ) Notice: Subject to any disclaimer, the term of this patent is extended or adjusted under 35 U.S.C. 154(b) by 57 days.

(21) Appl. No.: 09/591,640

(22) Filed: Jun. 9, 2000

(51) Int. Cl.[7] .............................................. E05C 19/10
(52) U.S. Cl. ....................................... 292/128; 292/228
(58) Field of Search ................................. 292/101, 102, 292/114, 128, 198, 202, 203, 228; 439/338, 341, 345, 350, 351, 352, 353, 354, 355, 357, 346, 358, 157, 372, 638; 361/728, 747

(56) References Cited

U.S. PATENT DOCUMENTS

| | | | | |
|---|---|---|---|---|
| 4,702,542 A | * | 10/1987 | Noyes | 439/357 |
| 5,153,817 A | * | 10/1992 | Hosoi et al. | 361/685 |
| 5,200,883 A | * | 4/1993 | Kobayashi | 292/228 |
| 5,603,535 A | * | 2/1997 | Antonucci et al. | 292/128 |
| 5,639,256 A | * | 6/1997 | Endo et al. | 439/358 |
| 5,702,266 A | * | 12/1997 | Jones | 439/357 |
| 5,741,150 A | * | 4/1998 | Stinson et al. | 439/358 |
| 5,975,929 A | * | 11/1999 | Matsuura et al. | 439/352 |
| 6,149,451 A | * | 11/2000 | Weber | 439/358 |

OTHER PUBLICATIONS

Removable Small Form Factor Fiber Optic Transceiver Module Chassis, Ser. No. 09/489,870, filed Jan. 20, 2000, Scott M. Branch, David P. Gaio and William K. Hogan.

Removable Latch and Bezel EMI Grounding Feature for Fiber–Optic Transceivers, Ser. No. 09/410,786, filed Oct. 1, 1999, Scott M. Branch, David P. Gaio and William K. Hogan.

Removable Small Form Factor Fiber Optic Transceiver Module and Electromagnetic Radiation Shield, Ser. No. 09/489,184, filed Jan. 20, 2000, Scott M. Branch, David P. Gaio and William K. Hogan.

* cited by examiner

Primary Examiner—Jack Lavinder
Assistant Examiner—Thomas J. Williams
(74) Attorney, Agent, or Firm—Allen, Dyer, Doppelt, Milbrath & Gilchrist, P.A.

(57) ABSTRACT

A push-to-release latching mechanism for retaining a transceiver module in a communication port of a computer or server is provided with a beam spring structure for positional restoration of the latch member, and the latch is supported and moveable relative to the host transceiver module. The latch member may be formed to include camming surfaces that facilitate the insertion of the transceiver module into a communication port and mate with a guide rail and connector resident in a communication port. The latch member may be adapted to latch with a rigid latch bar or a cantilevered spring. Additionally, the latch may be formed with a camming surface which insures that the latch is displaced to a latching position whenever network cables are connected to the transceiver module by camming the latch into the secure, latched position and subsequently preventing the latch from moving to an insecure or unlatched position. The latch member is pivotally supported on the transceiver module in a shaft/journal arrangement and thus is removed from the communication port whenever the transceiver module is removed, thereby preventing the latch from projecting from the communication port and being subject to damage. The latch member may be formed with a living hinge to provide a pivot axis and one end of the living hinge may be attached to a electronic module chassis or to a support structure which may be mated with a electronic module chassis for easy replaceability.

19 Claims, 20 Drawing Sheets

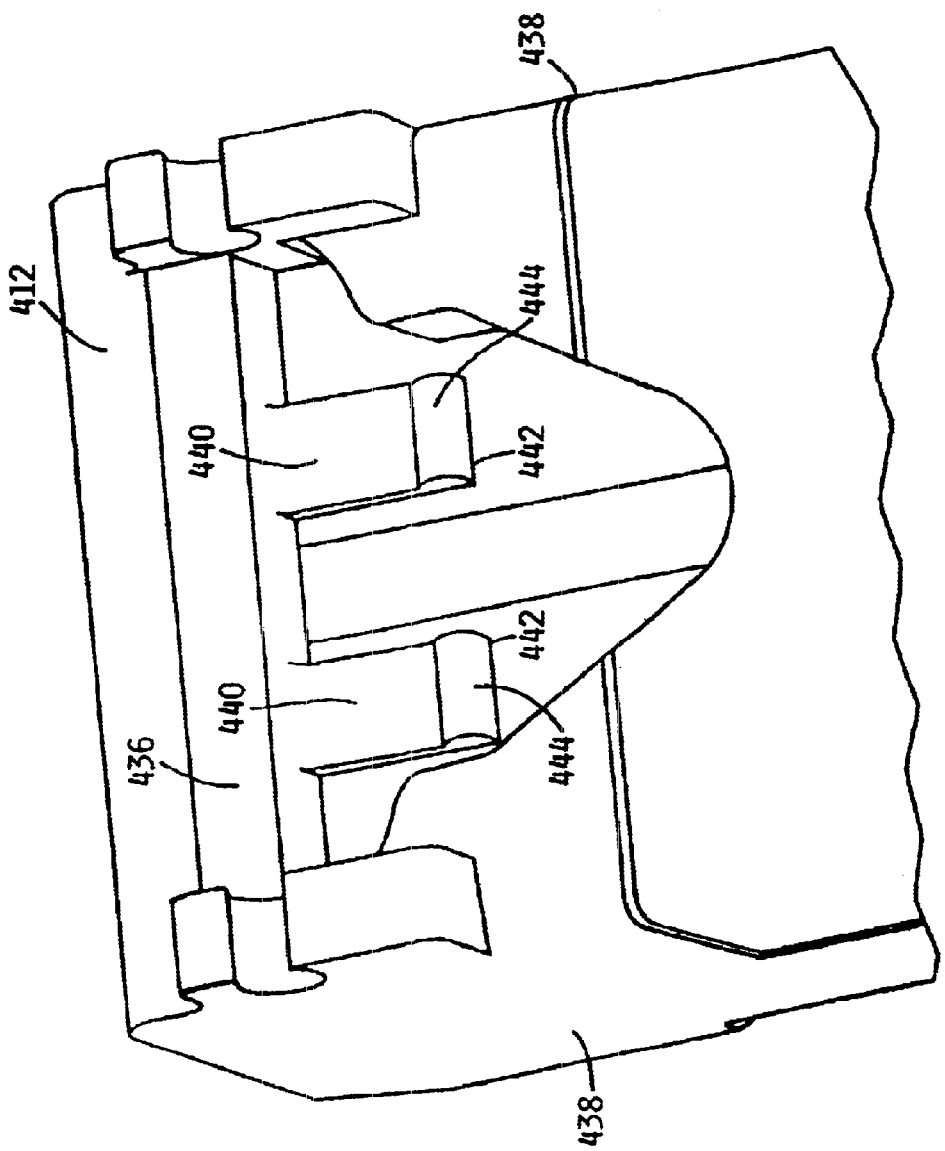

PIVOTING TYPE LATCH FOR REMOVABLE ELECTRONIC DEVICES

CROSS REFERENCE TO RELATED UNITED STATES PATENT APPLICATIONS

The following are related co-pending United States patent applications:

REMOVABLE SMALL FORM FACTOR FIBER OPTIC TRANSCEIVER MODULE CHASSIS, Serial No. 09/489,870, filed Jan. 20, 2000, by Scott M. Branch, David P. Gaio and William K. Hogan;

REMOVABLE LATCH AND BEZEL EMI GROUNDING FEATURE FOR FIBER-OPTIC TRANSCEIVERS, Serial No. 09/410,786, now U.S. Pat. No. 6,485,322, filed Oct. 1, 1999, by Scott M. Branch, David P. Gaio and William K. Hogan;

REMOVABLE SMALL FORM FACTOR FIBER OPTIC TRANSCEIVER MODULE AND ELECTROMAGNETIC RADIATION SHIELD, Serial No. 09/489,184, now U.S. Pat. No. 6,335,869, filed Jan. 20, 2000, by Scott M. Branch, David P. Gaio and William K. Hogan, which are incorporated herein in their entireties by this reference.

FIELD OF THE INVENTION

This invention relates to retaining mechanisms, and more specifically, to the latching mechanism utilized to retain an electrical interconnection and data signal conversion device in an installed condition, and thereby remain connected to circuitry within a computer or other electronic device.

BACKGROUND OF THE INVENTION

Increasingly, computers are being connected to other computers and servers using fiber-optic cable or coaxial cable. Efficient connecting or networking of the computers and servers requires the interchangeability of transceiver modules utilized to connect the coaxial or fiber-optic cable to the electronics of the computer or servers. The interchangeability of the transceiver modules is necessary to accommodate those differences between the electrical signals carried over coaxial cable and the light pulse signals carried on the fiber-optic cable, and then to convert the signals between the electronic signals used by the computer and the optical signals carried on the fiber optic cable network.

A standard is in the process of being established for the interconnection interface and the transceiver modules so that the various component suppliers of the devices can supply modules which are completely interchangeable without regard to their sources.

A very significant problem concerning one proposed design for the interconnection interface relates to the latch itself, which retains the transceiver module within the computer housing and connects by the interconnection interface within the communication port. This latch device projects outside the exterior limits of the electronic system or computer housing. The latch device, where it is accessible and operable outside the computer housing, is subject to impact or large forces such as sufficient pulling of the connected cable to break the latch. Projecting from the communications port, the latch device is not protected from impact and breakage except that a transceiver module is resident in the communications port and substantially will cover or protect the latch member. Should the projecting latch member be broken, the computer or server may require significant service time and expense to return the communications or network connection to a functional and reliable condition. Disruption to the service of the computer or server, while the system is at least partially disassembled for repair or replacement of the latch device, is cause for numerous related costs for a computer or server; their operating and service personnel, and any related schedules. Once the latch device is broken or becomes non-functional, the connection between the computer or server and the network cable, either co-axial or fiber-optic, may be made but the connection is subject to inadvertent disconnection and poor reliability, thereby disrupting the flow of data signals over the network and thus interrupting the functions of the computer or server.

Where the latch is a part of the guide rail system of the communications port, a broken latch member may require the replacement of the guide rail system or, alternatively, the replacement of the electronic circuit board to which the guide rail system is soldered or affixed. Such replacements are not only very expensive but time consuming and can greatly limit the operability and reliability of the electronic system.

OBJECTS OF THE INVENTION

It is an object of the invention to reliably latch a transceiver module into a reliable electrical connection within a communications port of an electronic system.

It is another object of the invention to provide an inexpensive and reliable latch for a transceiver module.

It is an additional object of the invention to provide the capability of removing and replacing the latch member without replacing the much more expensive transceiver module.

It is a further object of the invention to eliminate the need for a latch that protrudes unprotected from a communications port of an electronic system, thereby reducing the damage potential to the system from breakage of the latch.

It is still another object of the invention to maintain a reliable connection between the computer or server and the transceiver module inserted into a connecting port.

It is a still further object of the invention to minimize the inconvenience and expense of replacing broken or damaged latch members.

It is still an additional object of the invention that the removable and replaceable latch be the weakest component in the latching system to protect the transceiver module and the electronic system from damage from excessive forces applied to a communications data cable.

It is still another object of the invention to eliminate the need for skilled service personnel to replace broken latches on the transceiver modules that couple with the communications port of an electronic system.

It is still another object of the invention to provide a simple procedure for the operator to replace the latch member of a transceiver module.

It is a still further object of the invention to provide a retention member that breaks within a designed force range in order to prevent damage to any related expensive devices and as well as be operator-replaceable.

SUMMARY OF THE INVENTION.

A transceiver module for connecting electronic circuitry of an electronic system is a device which incorporates transceiver subassemblies. A transceiver subassembly receives electronic signals from the computer and converts those electronic signals to light pulse signals corresponding to the electronic signals for transmission over the network. The transceiver subassembly similarly will receive light pulse signals over fiber optic cable and convert the light signals to electrical signals for transmission to the computer. The transceiver subassemblies are connected to the network by a fiber optic cable connector, which is insertable into a transceiver module resident in a communications port of an electronic system. The transceiver module must be maintained in the communication port to insure reliable transmission of the optical signals on the fiber optic cable to the computer or server system. Similarly, a transceiver module capable of accepting and transmitting electronic signals over coaxial cable also may be inserted into the communications port of the computer whenever coaxial cable is used in the network.

An electronic or opto-electronic transceiver module is latched into position in the communications port by a latch disposed on the underside of the module; the module is manually unlatched as a latch tab is depressed. Depression of the latch tab will disengage a latch surface on the latch from a latch surface on a portion of the interconnection interface device, the system housing or the electromagnetic radiation shielding of the electronic system.

The latch is pivotally disposed on the transceiver module and biased to a latching position by a spring finger which is integrally formed as part of the latch. The latch, latch release tab, and spring are preferably integrally molded of a plastic.

Camming surfaces may be incorporated into the structure of the latch arm of the latch to cause movement of the latch arm during insertion of the transceiver module and latch into the electronic system. Further camming surfaces and projections may be formed into the latch arm structure to insure the latching surface of the latch arm is disposed juxtaposed to the latching surface on the interconnection interface device to establish a latching relationship and to maintain such relationship whether the coaxial or fiber optic cable connectors are resident within and connected to the transceiver module. Thus, the cable connectors must be removed before the transceiver module can be unlatched and removed from the electronic system.

Through adjustments of size and material, the latch is designed to be weaker than either the communications port hardware or the transceiver hardware. The latch is then sacrificed and replaced anytime the communications port, transceiver module, and communications data cable are stressed by excessive force applied to the cable. The replacement latch is snapped onto the transceiver module and the transceiver module is thereby returned to serviceability.

A more complete and detailed understanding of the invention may be secured from the attached drawings and the Detailed Description of the Invention to follow.

BRIEF DESCRIPTION OF THE DRAWINGS

FIG. 20 is a bottom isometric view of the transceiver module of FIG. 19 showing the integral restore spring members extending from a portion of an electronic module to engage and provide restore forces to a latch member carried by the electronic module.

DETAILED DESCRIPTION OF THE BEST MODE OF IMPLEMENTING THE PREFERRED EMBODIMENT OF THE

INVENTION AS CONTEMPLATED BY THE INVENTORS

The following description of the invention is made for purposes of disclosure of the best mode of the preferred embodiment and is not intended to limit the invention in any manner or limit the attached claims which define the scope of protection afforded the invention.

Figure 1:
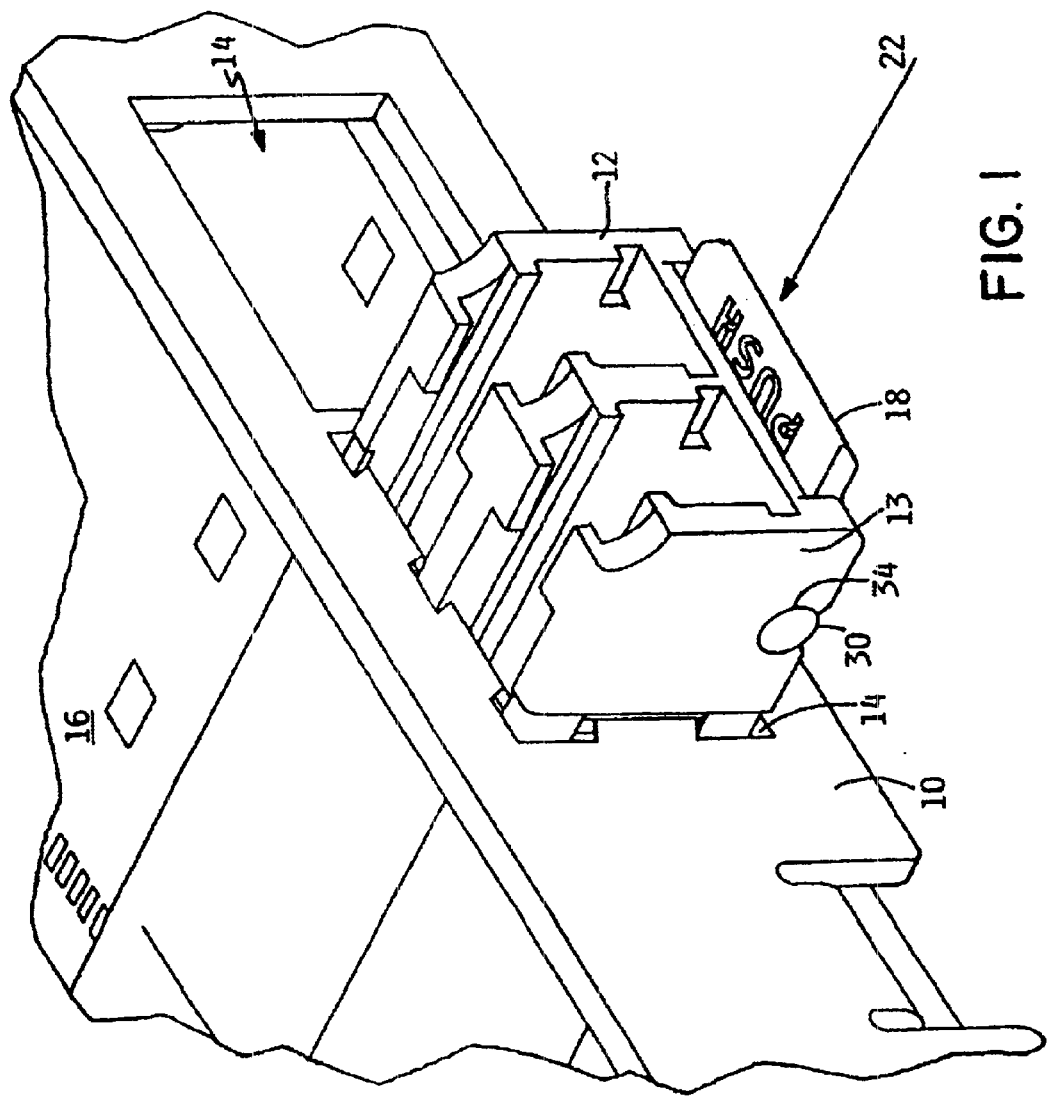
FIG. 1 is an isometric illustration of the front portion of a transceiver module, projecting from the exterior of a bezel or housing, used to connect a network data cable to a computer and a latch projecting from below the transceiver module.

Initially for purposes of disclosure of the invention, reference is made to FIG. 1 where a bezel 10 or housing member 10 of an electronic system housing (not shown) is illustrated with a transceiver module 12 inserted into a communications port 14, which is ready to receive connectors (not shown) to connect the transceiver module 12 to a communication network which, in turn, interconnects a plurality of computers and/or servers.

The transceiver module 12 is retained within the electronic system bezel 10 by a latch arrangement. The transceiver module 12 must be readily removable to permit other similar modules to be inserted and connected. The transceiver modules 12 are interchangeable as required depending upon the type cable used in the network interconnections, such as coaxial cable or fiber optic cable.

Figure 3:
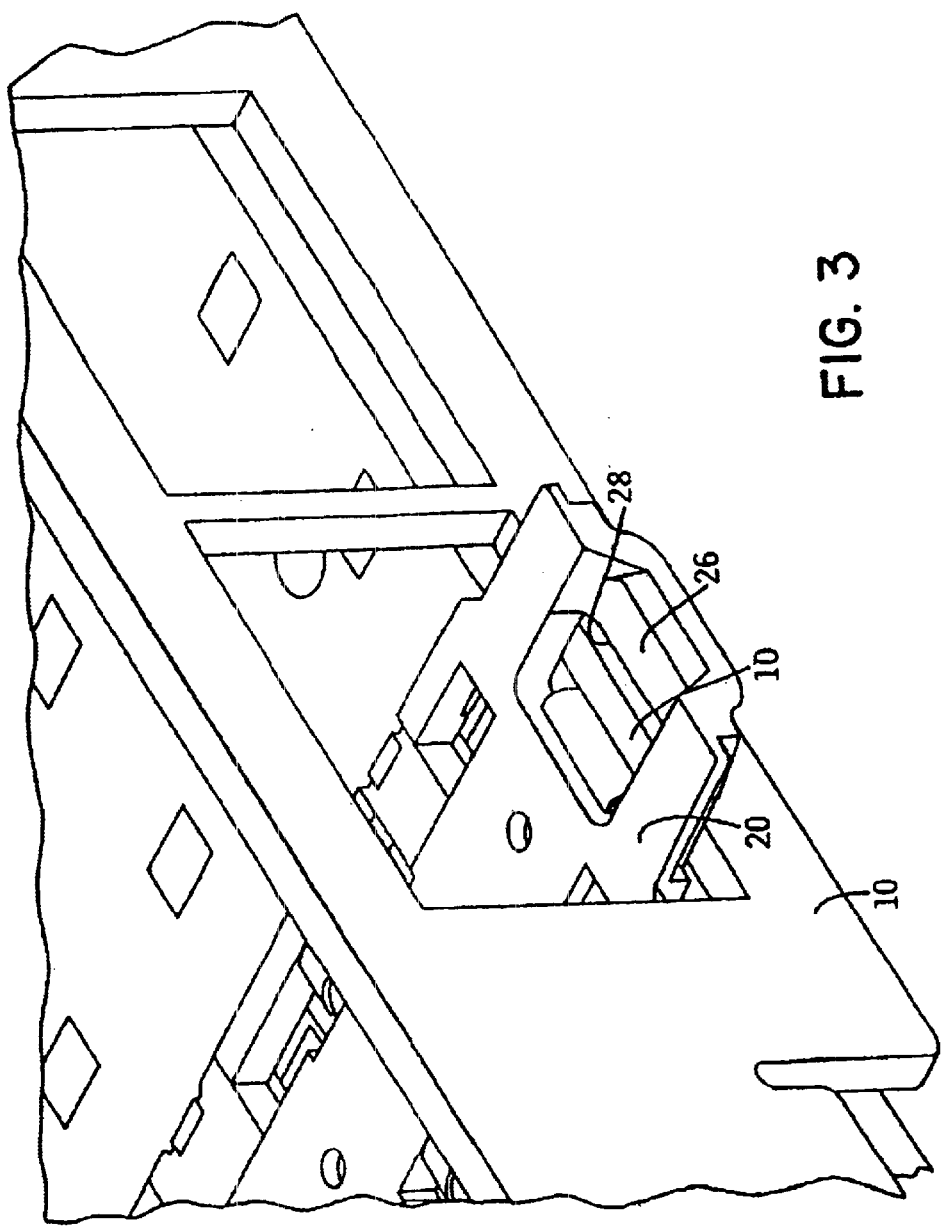
FIG. 3 is an elevated isometric view of the guide rail and latch bar engageable by a latch and transceiver module whenever installed.

Latches have been proposed to be incorporated into the guide rail similar to the guide rail as partially shown in FIG. 3. The guide rail 20 is typically mounted on an electronic circuit board 16 of the electronic system of which it is a part.

Such a latch is illustrated and disclosed in: U.S. patent application Ser. No. 09/489,870, filed Jan. 20, 2000, for REMOVABLE SMALL FORM FACTOR FIBER OPTIC TRANSCEIVER MODULE CHASSIS by Scott M. Branch et al.; and, in U.S. patent application Ser. No. 09/410,786, filed Oct. 1, 1999, REMOVABLE LATCH AND BEZEL EMI GROUNDING FEATURE FOR FIBER-OPTIC TRANSCEIVERS by Scott M. Branch, David P. Gaio and William K. Hogan; cross referenced above as related co-pending applications.

Figure 2:
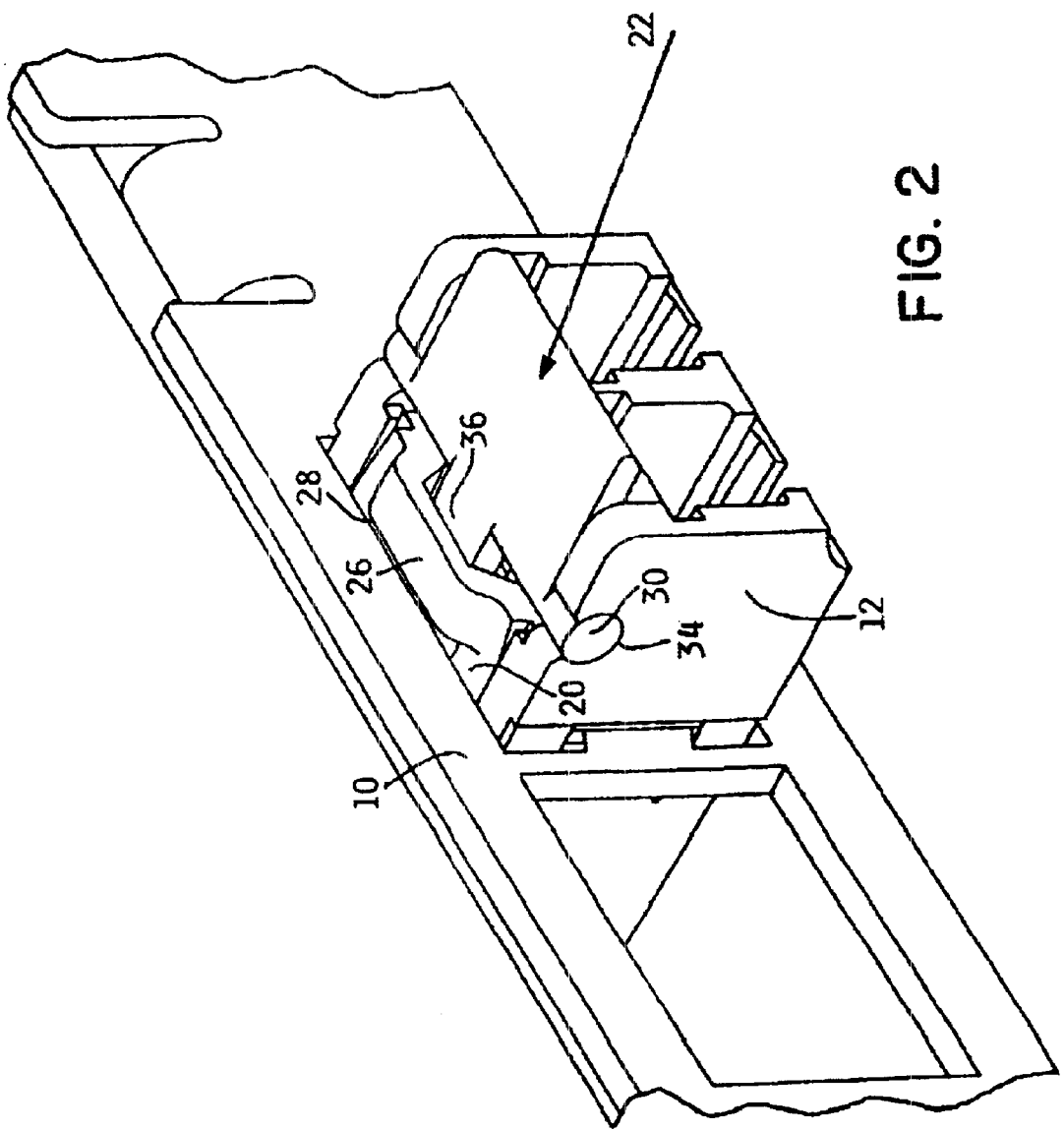
FIG. 2 is a bottom isometric view of a front portion of a transceiver module projecting from the bezel which shows a latch engaged in a communications port of a computer.

With reference now to FIG. 2, the present latch 22 forms a part of the transceiver module assembly 12. Manually engageable portion 18 or tab 18 projects from the front of transceiver module 12 and is removed from the bezel 10 whenever the transceiver module 12 is removed. The push tab 18 is a portion of the latch 22 and extends from a shaft 30 which, in turn, is carried by a snap-in journal 34 formed in the bottom of side walls 13 of the transceiver module 12 during its formation or molding. The snap-in journal 34 not only receives the shaft 30 of latch 22 but also provides a capability of changing a broken or nonfunctional latch 22 for another latch 22. The latch 22 typically is small as dictated by the dimensions of the transceiver module 12 and the communications port 14.

Reference is again made to FIG. 2. The transceiver module 12 is shown from the bottom in an isometric view and mated with the guide rail 20. The guide rail 20 is formed or fabricated to create a latch bar 26 with a latch bar latch surface 28 facing toward the interior of the bezel 10. The latch bar latch surface 28 is engageable by latch arm 36 and particularly latch 22.

Figure 5:
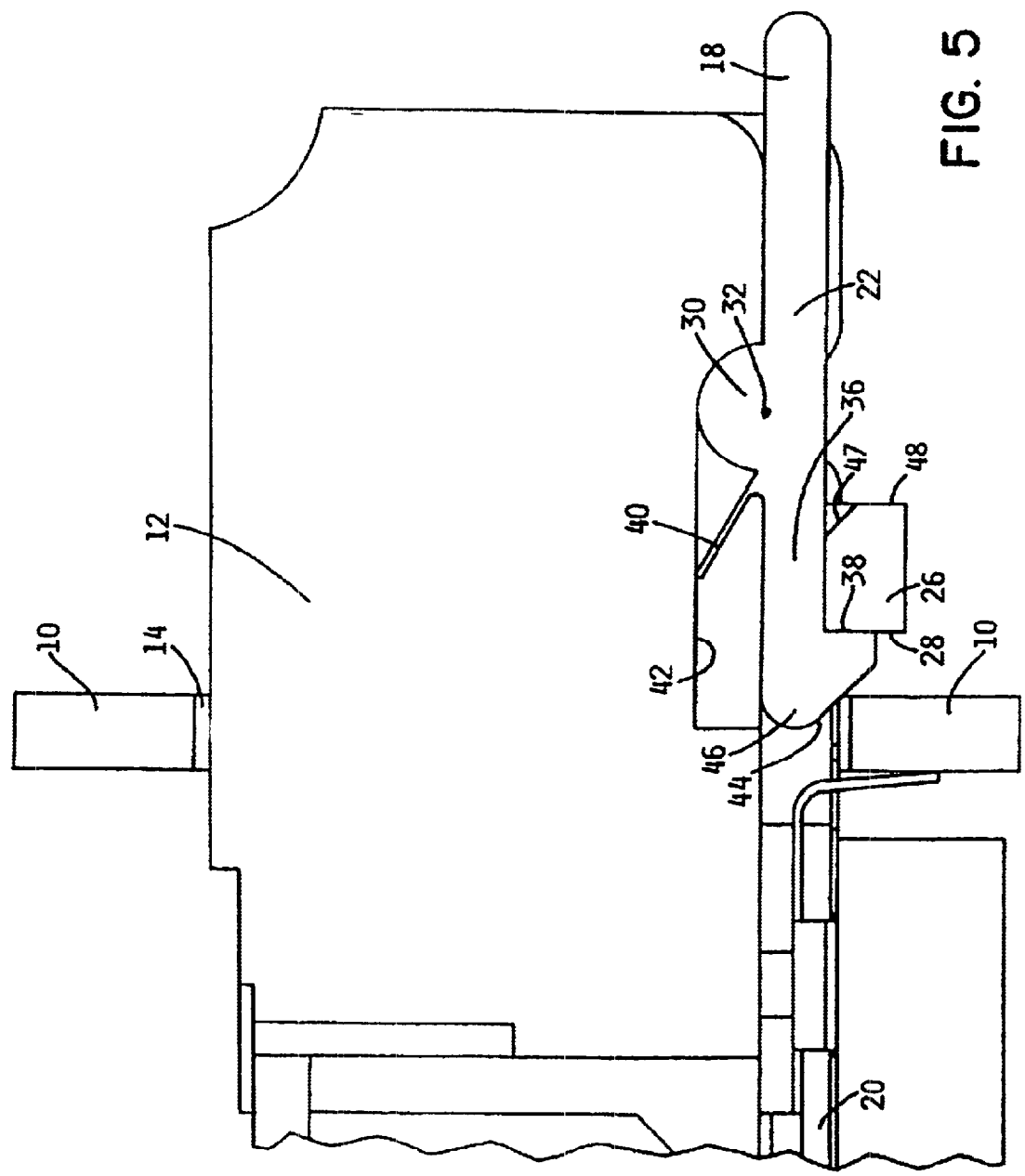
FIG. 5 is a sectioned side view of a latch, latch bar and front portion of the transceiver module.

FIG. 3 illustrates a portion of guide rail 20 including the latch bar 26 and latch bar latch surface 28. The latch bar 26 is formed at an offset depressed level lower than the floor of the guide rail system to permit insertion of the transceiver module 12 into the bezel 10 and onto the guide rail 20 so that the latch device 22 will clear the latch bar 26. In FIG. 5, latch arm 36 is shown forming angled surface 44 which engages latch bar 26, interacting with surface 47 of latch bar 26 to pivot latch 22 and cause latch end 46 to rise above and pass latch bar 26 upon insertion of the transceiver module 12 and latch 22 into the communications port 14.

Figure 4:
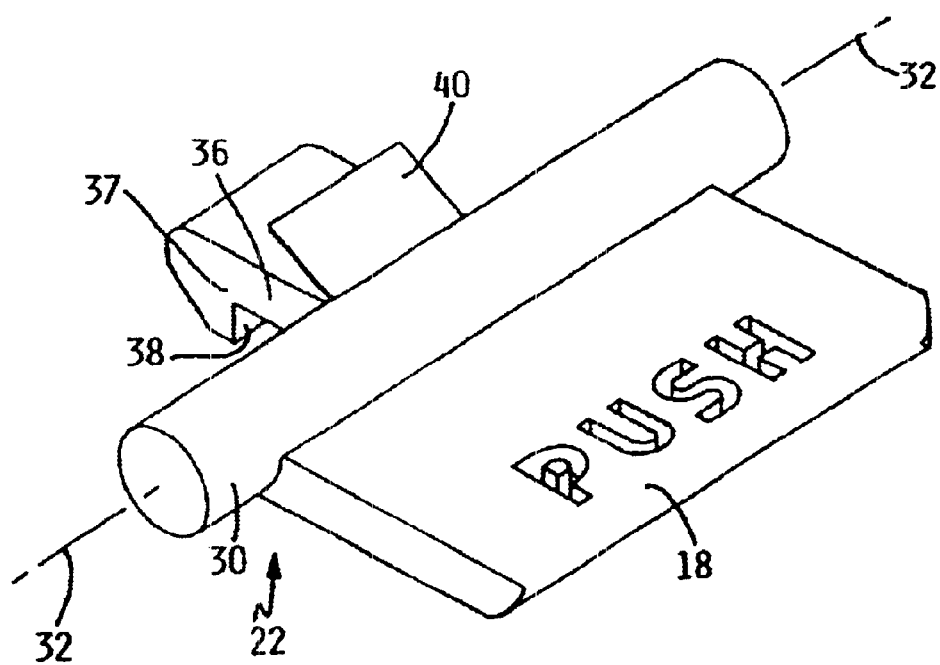
FIG. 4 is an isometric view of a latch.

Referring now to FIG. 4, a latch 22 is comprised of a shaft 30 extending transverse to the latch tab 18 forming an axis of rotation 32 for latch 22. The diameter of shaft 30 is determined to be such that it forms a pivotal fit with journal 34 in FIGS. 1 and 2. The journal 34 is a snap-in configuration which accepts the shaft 30 of latch 22.

Referring again to FIG. 4, a latch arm 36 extends from the shaft 30 and is located opposed to the manually engageable push tab 18. Upon manual displacement, latch arm 36 will move in response to movement of push tab 18 in the same rotational direction, clockwise as viewed.

The latch arm 36 is formed to include a latch surface 38 which is disposed generally tangential to the arc of movement of the latch surface 38 about axis 32. The latch surface 38 is engageable with latch bar 26 and latch bar latch surface 28. The latch surface 38 together with latch arm 36 form a latch hook 37.

Latch 22 is further provided with a cantilevered beam spring member 40. Preferably, the beam spring member 40 extends from the latch 22 substantially radially from shaft 30, latch arm 36 or both at the junction of the latch arm 36 and the shaft 30. The beam spring member 40 is preferably comprised of plastic and integrally formed with the latch member 22 during molding. Plastic beam spring member 40 can be deflected by pivoting latch 22 to store energy and, upon release, the beam spring member 40 restores to an undeflected shape. Due to the their small dimensions, the latch 22 and, particularly, the shaft 30 portion and latch arm 36 or latch hook 36 thereof are inherently weak and subject to breakage either in the normal course of handling and operation or as subjected to forces transmitted through the transceiver module, such as forces from pulling on the cables. Although a relatively expensive device, the transceiver module 12 is sturdy and able to withstand the normal usage far better than the small latch 22. The latch 22, being removable from the journal 34, may be replaced as needed for a very small fraction of the cost of the transceiver module 12. The latch 22 is snapped out of the journal 34, and the replacement latch 22 snap-inserted into the journal 34.

Since the latch 22 is snapped onto the transceiver module 12, it can also be removed and replaced if damaged. Through choice of size and material, the latch 22 is preferably designed such that either latch end 46 or shaft 30 are made weaker than any component or feature within the communications port 14 or transceiver module 12.

With spring member 40 acting against an abutting surface such as bottom surface 42 of transceiver module 12, the resistance of spring member 40 will urge the latch 22 in a counter-clockwise direction. The spring 40 restores the latch arms 36 to either a latched position whenever transceiver module 12 is inserted into communications port 14 or to a rest position in preparation for latching the latch bar 26 whenever removed from the communication port 14.

Again referring to FIG. 5, it will be understood that simply inserting a transceiver module 12 into communication port 14 will cause rotation of latch arm 36 about axis 32 and further pass the latch end 46 over latch bar 26. Once clear of latch bar 26, latching surface 38 will be lowered by the rotation of latch arm 36 (counterclockwise as viewed) to return latch 22 to its latching/rest position relative to transceiver module 12 and latch bar 26 as a result of the restoration of spring 40 to an undeformed condition.

Latch bar 26 provides a latch surface 28 oriented generally orthogonally to an axis of insertion of the transceiver module 12. Latch surface 28 is engageable by the latch surface 38 of latch member 22 whenever the transceiver module 12 is fully seated on and connected to the guide rail assembly 20. Latch bar 26 further is formed with an angled surface 47 joining outboard surface 48. The angled surface 47 acts as a cam surface to interact with surface 44 of latch bar 26 to cause latch end 46 to rise above and pass latch bar 26 upon insertion of the transceiver module 12 and latch 22 into the communications port 14.

Depression of tab 18 will deform spring 40 and rotate latch 22 clockwise through a limited arc of movement. The latch arm latching surface 38 is displaced away from latch bar 26 and thus disengaged, permits the removal of transceiver module 12 from the communication port 14.

A second embodiment of the pivot type latch for use in the same environment is illustrated in FIGS. 6 through 12. Initially referring to FIG. 6, the latch 122 is mounted to the transceiver module 112 by shaft 130 and journal 134 in substantially the same manner as the mounting of the first embodiment in FIGS. 1 through 5. Actuator tab 118 or latch tab 118 projects from beneath the transceiver module 112 and is accessible for manual actuation.

Figure 7:
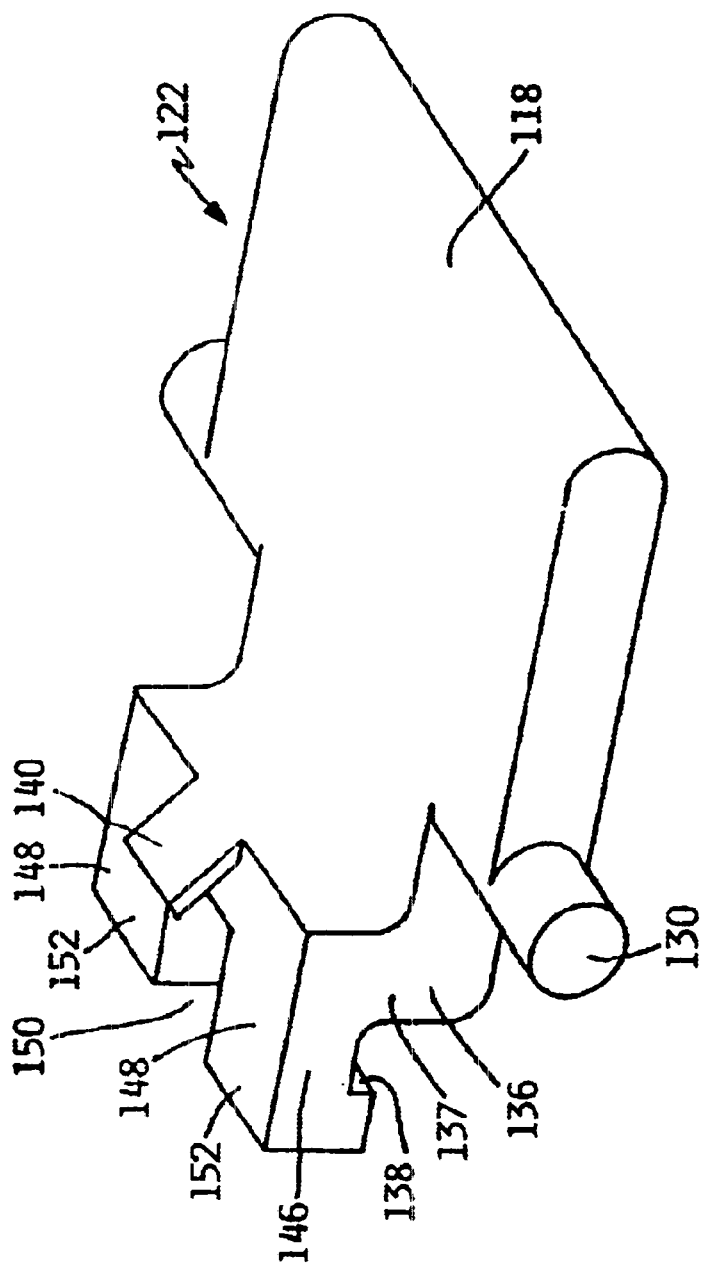
FIG. 7 is an isometric illustration of the latch of a second embodiment.

Referring to FIG. 7, the latch 122 is formed with shaft 130 plus an actuator tab 118 and latch arm 136 protruding from opposed sides of shaft 130. Latch arm 136 is comprised of offset segment 137 and a distal segment 146. The end of distal segment 146 preferably is formed with a gap 150 between the two portions 152 projecting from offset segment 137 in order to accommodate a central wall 154 of the transceiver module 112 (visible in FIG. 8) and to be discussed below. If the structure of the transceiver module 112 does not have an interfering structure aspect, the projecting portions 152 may be formed as a unitary element.

Again viewing FIG. 7, the integrally molded spring member 140 is formed on and projecting from a top surface 148 of the latch arm distal segment 146 or on the upper end of the offset segment 137 of latch arm 136. The spring 140 acts to bias the latch arm 136 into a latched position analogous to the action of spring member 40 of the embodiment shown in FIGS. 4 and 5. Latching surface 138 on the lower portion of distal segment 146 is fully analogous to latch surface 38 discussed above.

Figure 8:
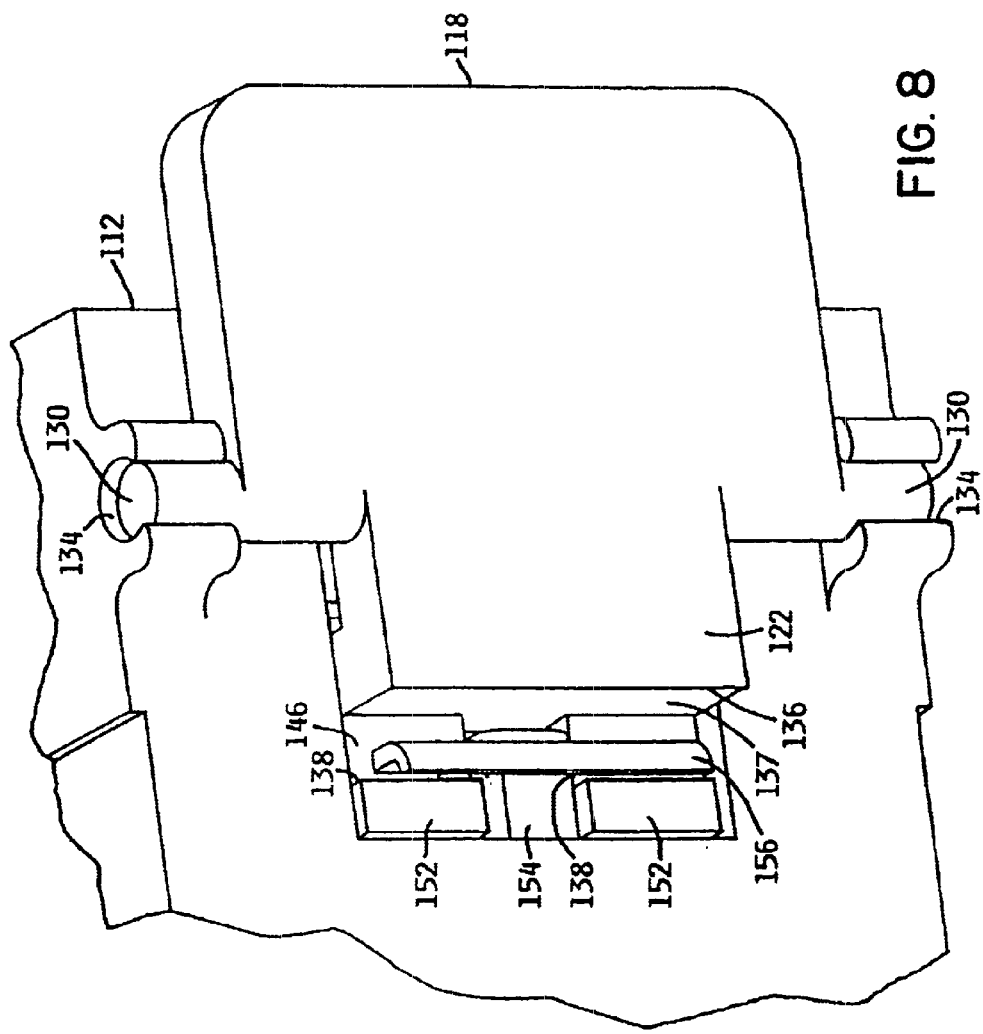
FIG. 8 is a rear bottom isometric illustration of a transceiver module, latch, and cage latch bar of the second embodiment.
Figure 9:
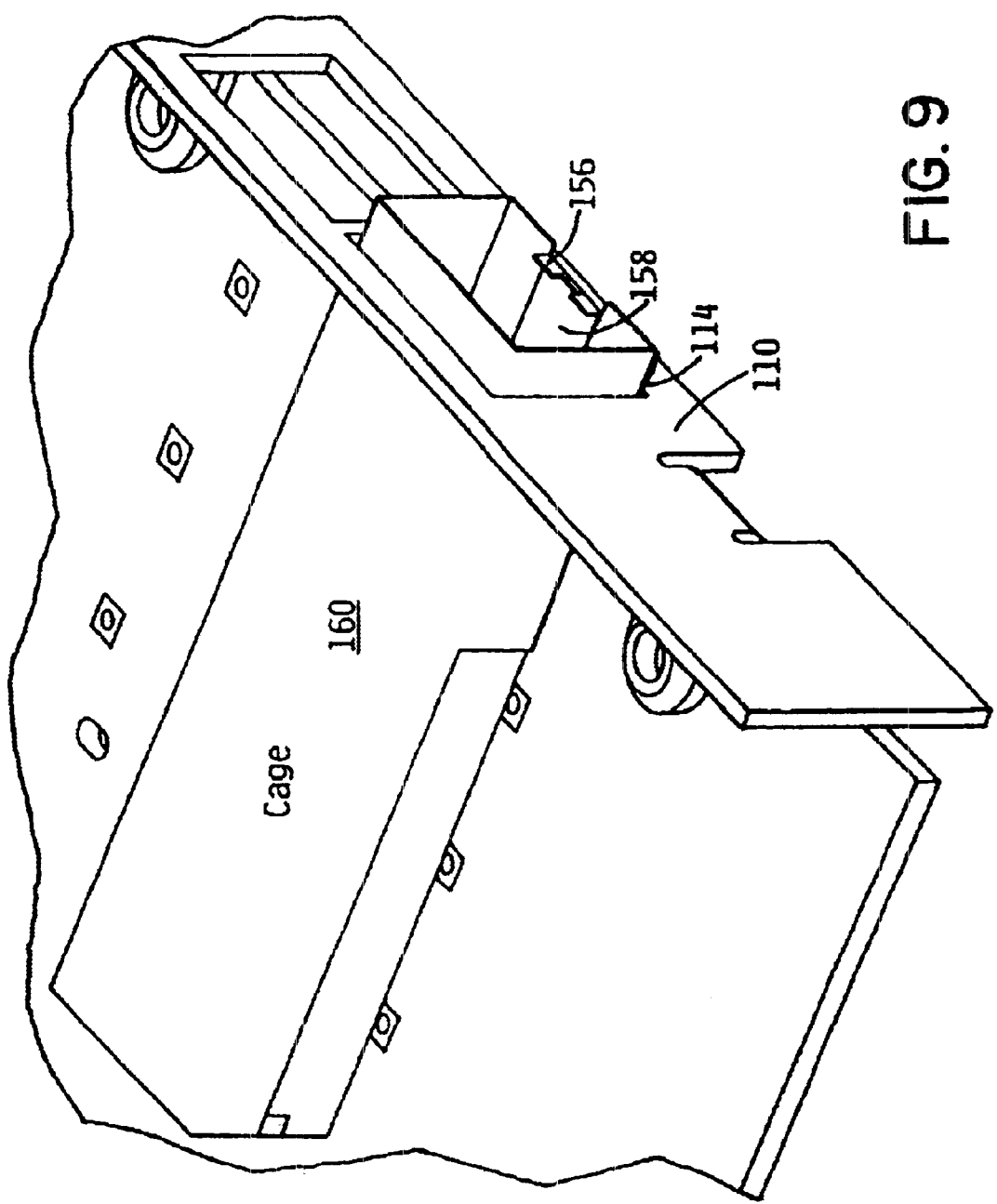
FIG. 9 is an isometric illustration of a computer bezel or housing and an electromagnetic radiation shield installed on an electronic circuit board to prevent or attenuate the escape of electromagnetic radiation from a communications port.

FIG. 8 illustrates a bottom isometric view of transceiver module 112 and particularly latch 122. Latch 122 is assembled to transceiver module 112 in the same manner as latch 22 is mounted with respect to transceiver module 12 of the first embodiment illustrated in FIGS. 1–5.

The offset segment 137 extends into the volume of the transceiver module 112 and the distal portion 146 extends above latch plate 156. Latch plate 156 is a transverse retaining member formed from a portion of the electromagnetic radiation shield 160 or cage 160 of FIG. 9 which surrounds the module connector (not shown) and extending at least to and preferably through the communications port 114 in the bezel 110 as observable in FIG. 9. The latch plate 156 extends in a plane generally orthogonal to the long axis of the transceiver module 112. Latch plate 156 is supported by a cantilevered beam 158 extending from and forming a part of the floor of the shield cage 160. The beam in this embodiment is preferably rigid but may be deflectable, if desired, to ease insertion of transceiver module 112 with a camming surface on projecting portions 152. The latch plate 156 preferably is formed of a portion of cage 160 but, alternatively, could be an upstanding lip (not shown) formed on the edge of the communications port 114 in bezel 110. Latch plate 156 is disposed to be engaged by the latch surface 138 on latch 122.

Figure 10:
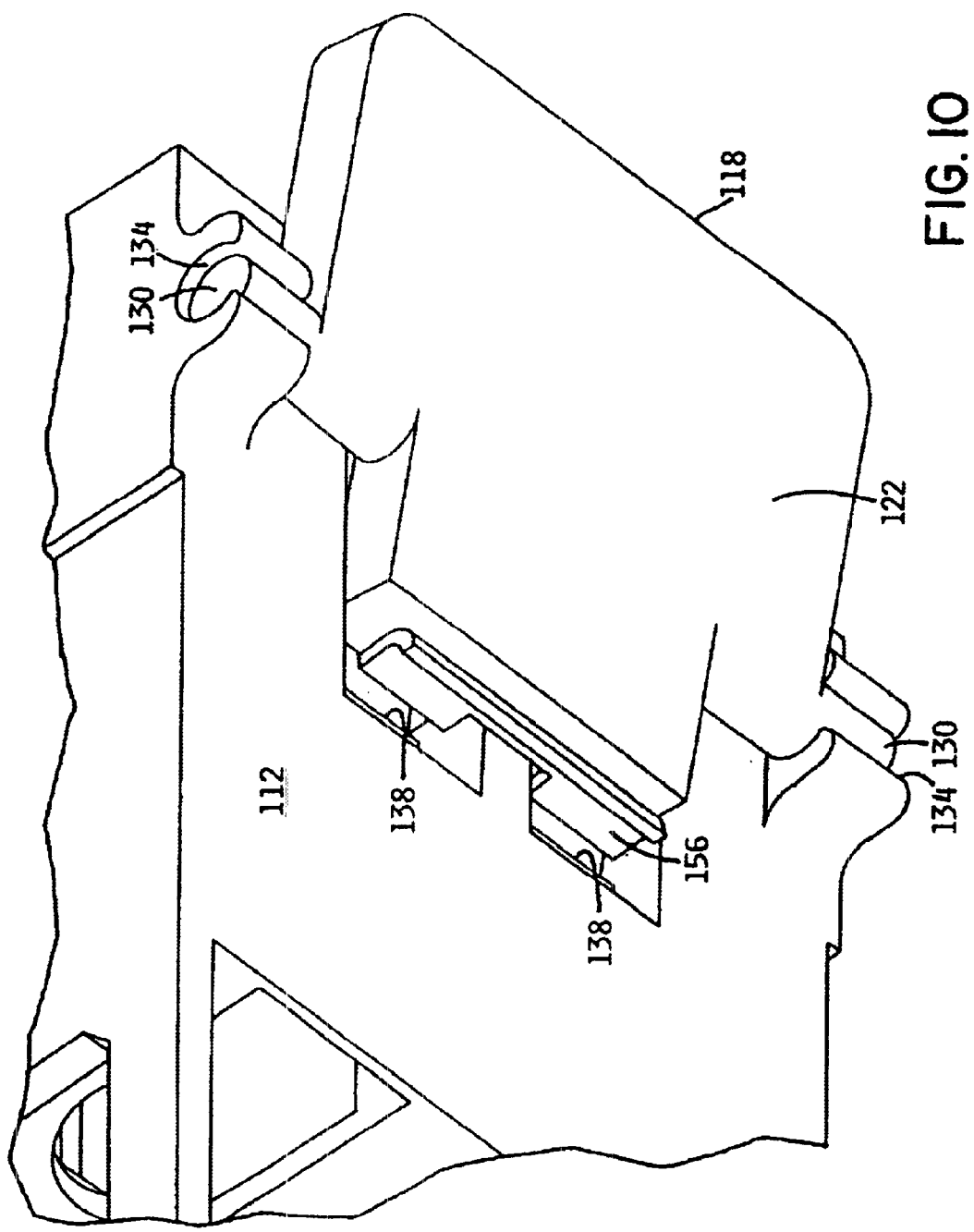
FIG. 10 is a rear bottom isometric of the assembly of FIG. 8 with the latch displaced to disengage the electromagnetic radiation shield latch bar.

Manual depression of the latch tab 118 of latch 122 will cause the raising of the latch surface 138 as shown in FIG. 10 to disengage latch surfaces 138 from latch plate 156, permitting the removal of transceiver module 112 from the communication port 114.

Figure 11:
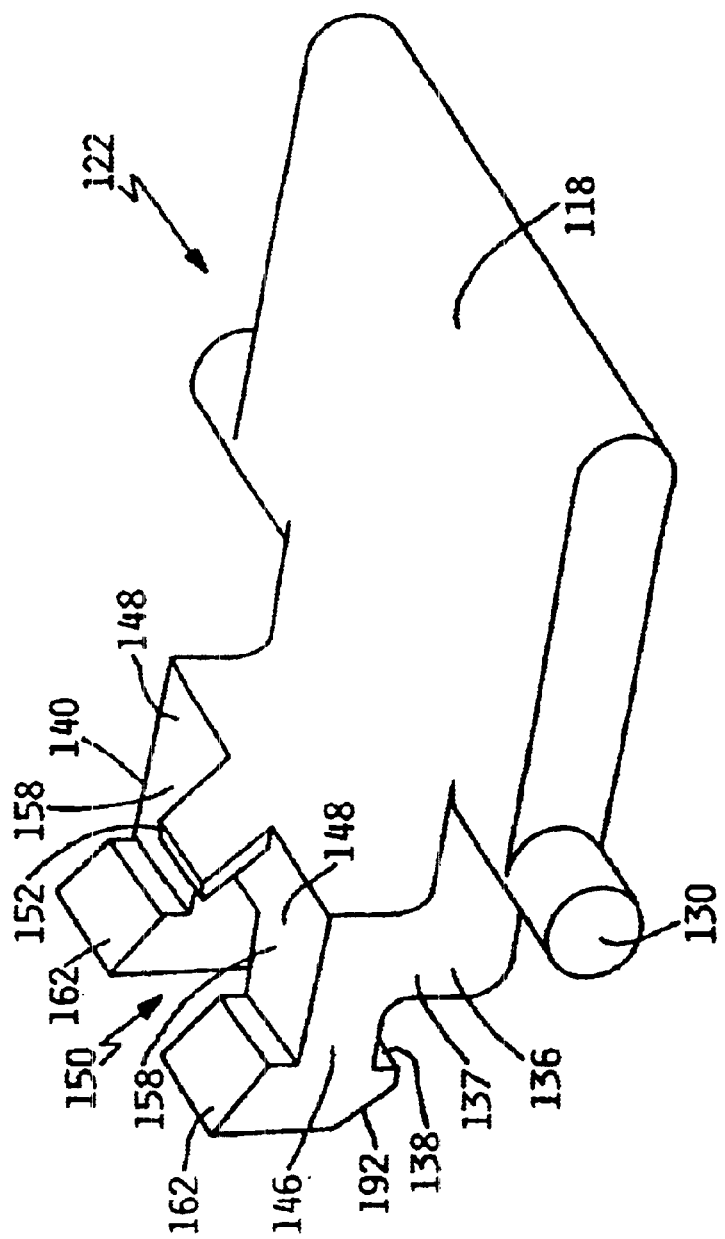
FIG. 11 is an additional embodiment of a latch having camming and locking members to prevent inadvertent disconnection of a transceiver module once the module is fully connected with data cables.

To further improve the latching function and reliability of the latch 122 as illustrated in FIG. 11, the top surface 148 of distal portions 146 (as viewed in FIG. 7) may be extended upwardly and formed into sloping cam surfaces 162, with the lowest part of the cam surface 162 positioned closest to the outboard end of the latch 122. The cam surface 162 is engageable by the bottom edge of the inboard end 170 of cable connectors 166 as illustrated in FIG. 6.

Figure 6:
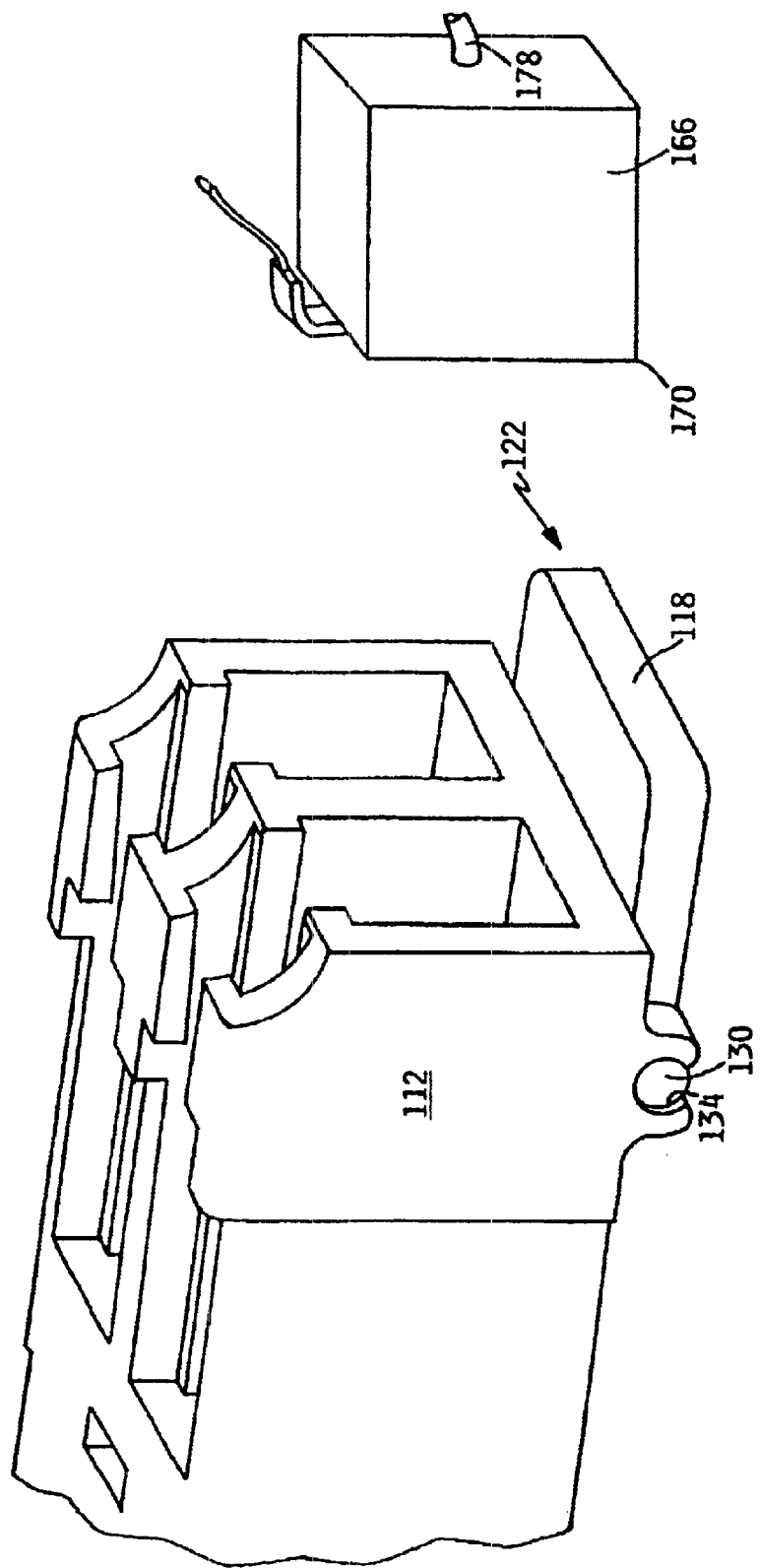
FIG. 6 is an isometric view of a front portion of a transceiver module supporting a second embodiment of a latch of the invention.
Figure 12:
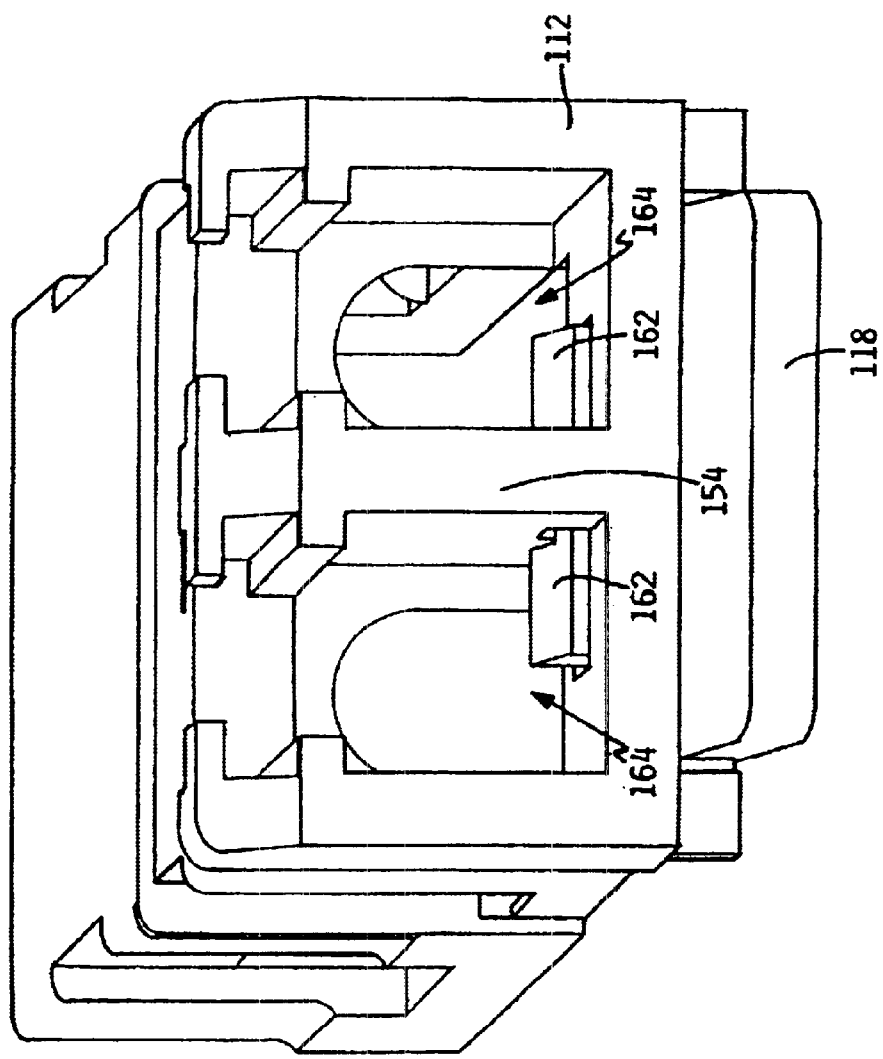
FIG. 12 is a frontal perspective view of a latch of FIG. 11 and a transceiver module with its camming and locking members of the latch visible.

Referring now to FIG. 12, the sloping cam surface 162 may be displaced upwardly into cavities 164 or openings 164 into which the cable connectors 166 of FIG. 6 of the cables 178 of the network (not shown) occupy when connected. Upon insertion into cavities 164 of transceiver module 112, cable connectors 166 will connect to a transceiver optical subassembly (not shown). During insertion, the cable connector 166 will engage and depress cam surfaces 162, subsequently ensuring the latch surface 138 (as seen in FIG. 7) is positioned behind the latch plate 156 (as in FIG. 8). Further, distal segment 146 and camming surfaces 162 will be blocked from rising into transceiver module 112 and particularly cavities 164 so long as the cable connectors 166 are present in cavities 164; consequently, this effectively locks transceiver module 112 into the communication port 114 and is connected to the electronics within the system housing of which bezel 110 is a part.

Similarly, FIG. 11 illustrates the latch 122 formed to incorporate camming surface 192 (on the opposing side of the distal portion 146 from camming surface 162) which will engage the latch plate 156 and cause the distal portion 146 of latch arm 136 to ride over latch plate 156 anytime transceiver module 112 is being inserted into the communication port 114.

Figure 13:
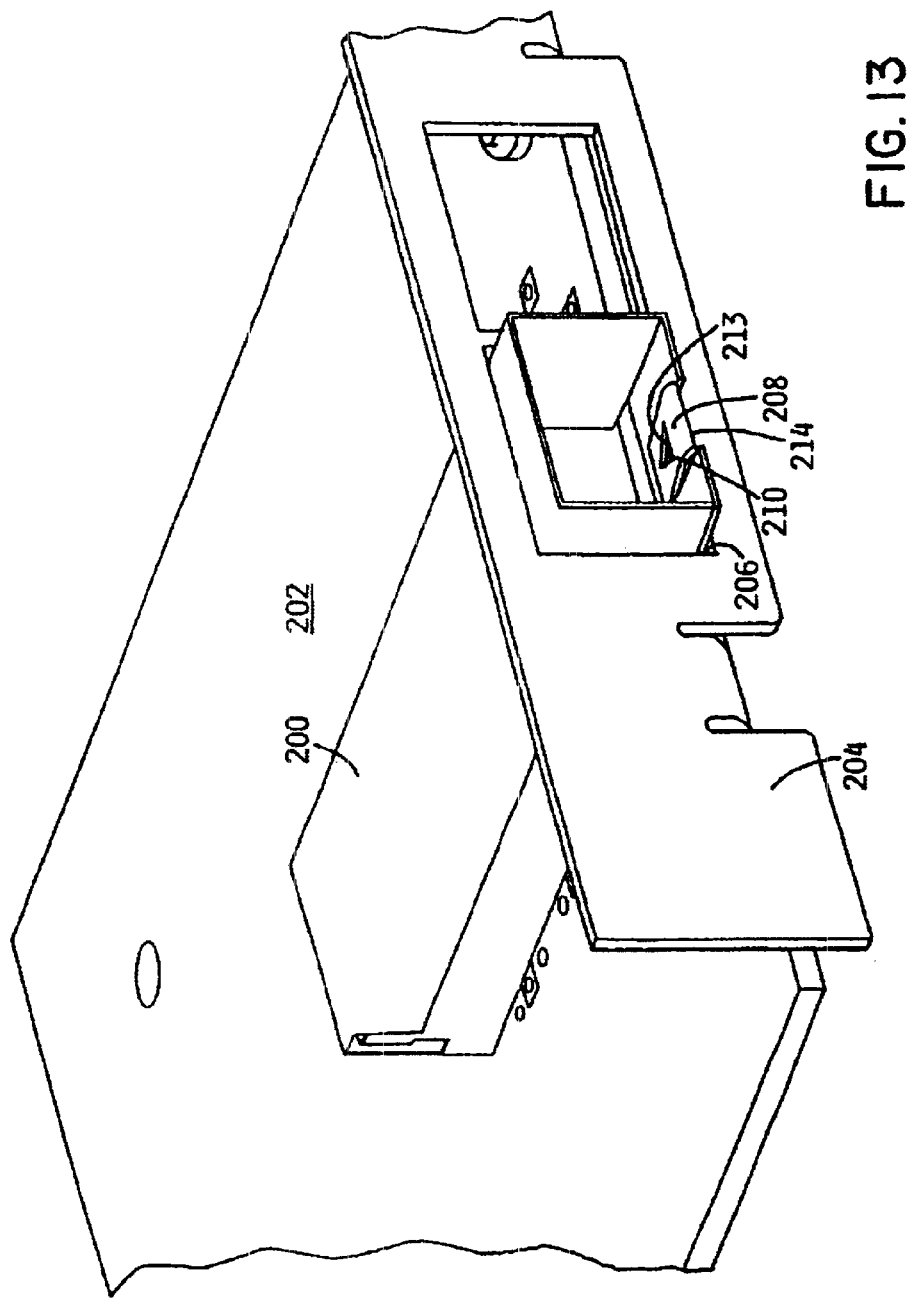
FIG. 13 is an isometric view of an electronic circuit board, electromagnetic radiation shield cage and system housing bezel with the shield cage projecting through the bezel and providing a retaining member for engagement with a latch member.

Referring to FIG. 13, a cage 200 of another embodiment of the invention is attached to electronic circuit board 202 and projecting through a port 206 in the electronic system housing 204 or bezel 204. The cage 200 has a cantilevered beam spring 208 formed as a part of or attached to the electromagnetic radiation shield or cage 200. The beam spring 208 is provided with a generally triangular opening 210 with one edge or side 213-transverse to the axis of the beam spring 208 and the cage 200. The opening 210 and, specifically, edge 213 on distal end 214 of beam spring 208 form an engaging surface that engages and retains latch member 222 (seen in FIG. 14).

Figure 14:
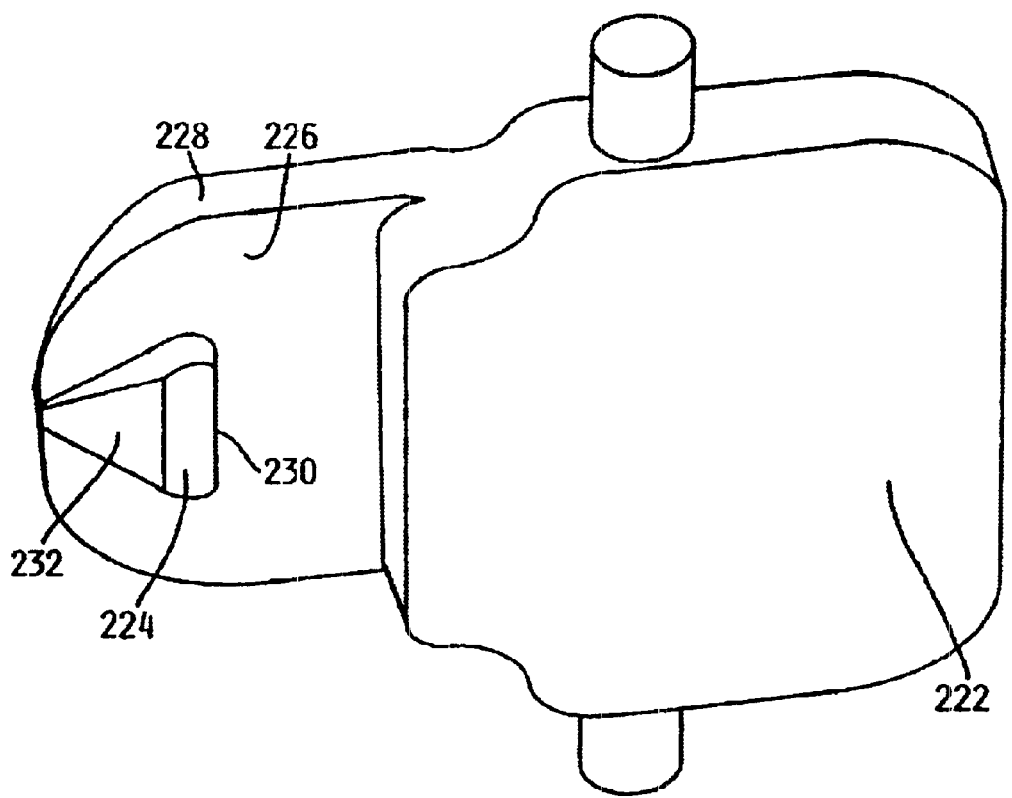
FIG. 14 is a bottom isometric view of a latch member that mates with the retaining member illustrated in FIG. 13.
Figure 15:
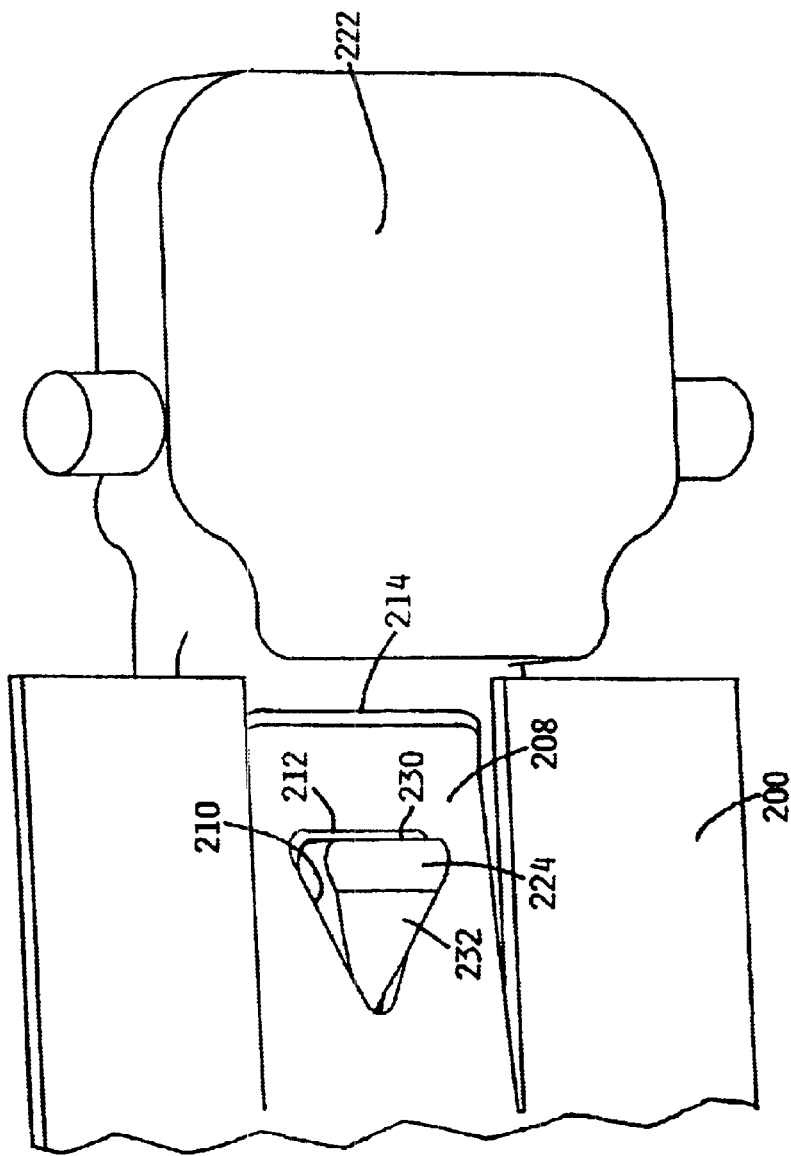
FIG. 15 is a bottom isometric illustration of the latch member of FIG. 14 mated and engaged with the retaining member of the shield cage illustrated in FIG. 13.

Referring now to FIGS. 14 and 15, the latch member 222 is shown from the bottom illustrating the latching portion 224 projecting from the bottom surface 226 of latch arm 228 or latch hook 228. Latching portion 224 is comprised of a latching surface 230 and inclined surface 232. Inclined surface 232 engages beam spring 208 and either is rotated out of the path of beam spring 208 or deflects beam spring 208, thereby permitting latching member 224 to pass the distal end 214 of beam spring 208 whenever the latching member 222 is being inserted and latched into shield or cage 200.

Edge 212 will engage latch surface 230 to retain the latch member 222 and the transceiver module (not shown in FIGS. 14 and 15) against movement in an outward, unplugging direction. The latch member 222 is carried by a journal of a transceiver module (not shown) analogous to the transceiver modules 12 and 112 described above with respect to at least FIGS. 1, 2, 6, 8 and 10.

Latch member 222 may be further provided with a restore spring (not shown) similar to beam spring 40, 140 described with reference to earlier embodiments described above. The beam spring 40, 140 may be made of a metal spring material and inserted into a socket (not shown) formed by molding in the shaft 30,130; the latch arm 36, 136, 228; the offset segment 137; or any other suitable portion of the latch 22, 122.

Figure 16:
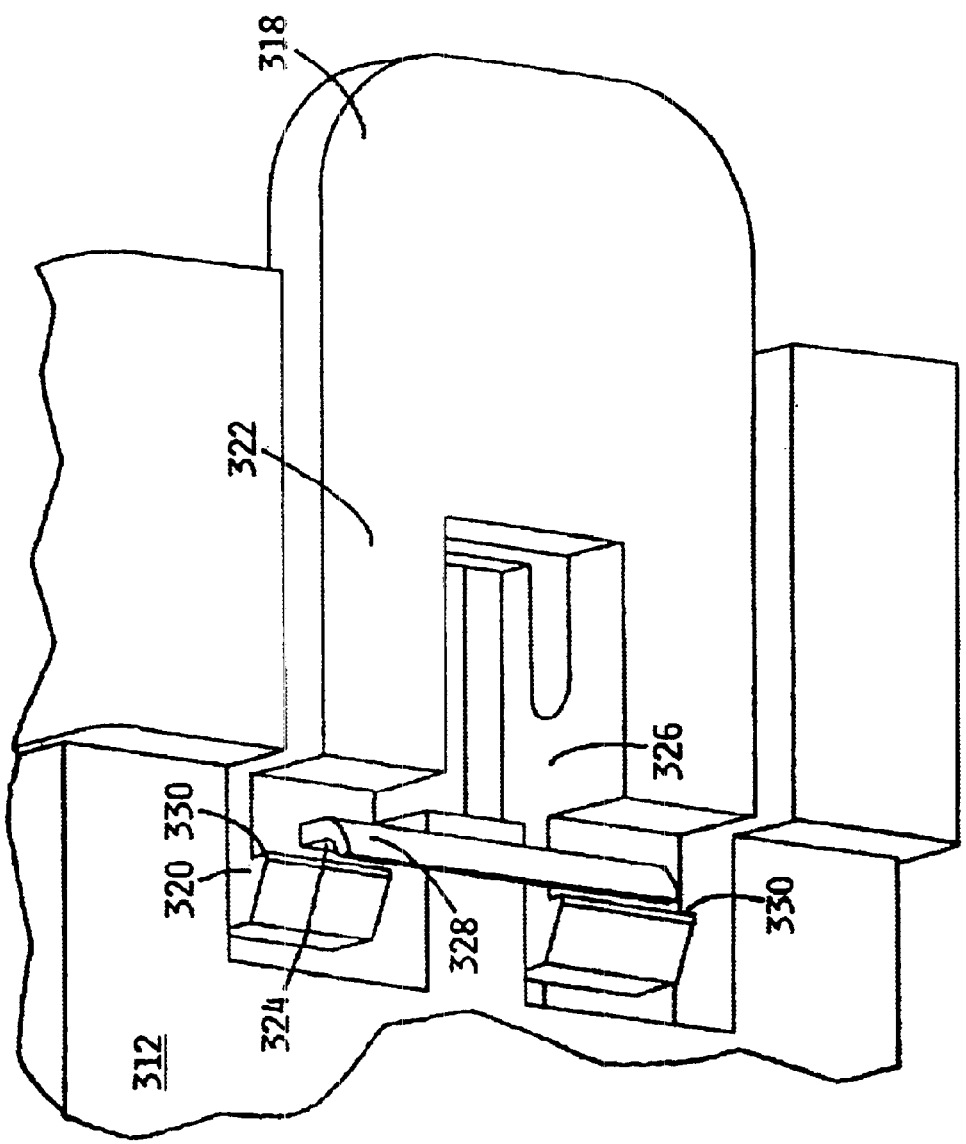
FIG. 16. is a bottom isometric illustration of the latch member of an additional embodiment of the latch member supported by a deformable web or living hinge.
Figure 18:
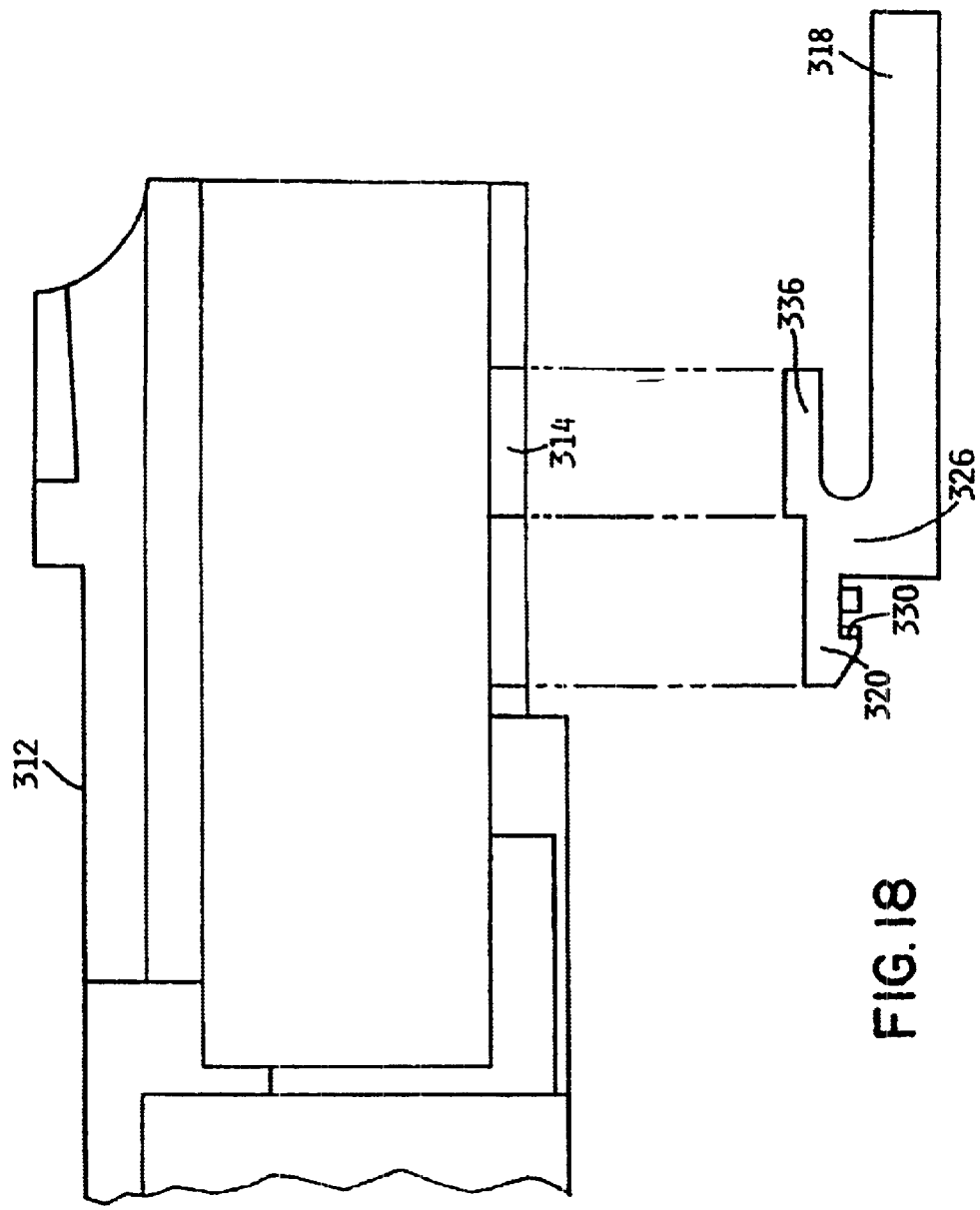
FIG. 18 is a side section view of the transceiver module and a replaceable version of the latch member of FIG. 16 exploded away from the transceiver module.

An alternative latch design for incorporation into a transceiver module 312 is illustrated in FIG. 16. The latch member 322 may be integrally molded into the chassis of transceiver module 312 or may be made as a separate part and assembled with the chassis of transceiver module 312, as shown in FIG. 18. This alternative design has a manually engageable latch tab 318 and a latch hook 320 carrying a latch surface 330, analogous to the latch arms 36, 136 and latch surfaces 38, 138 of the latch embodiments described above.

Figure 17:
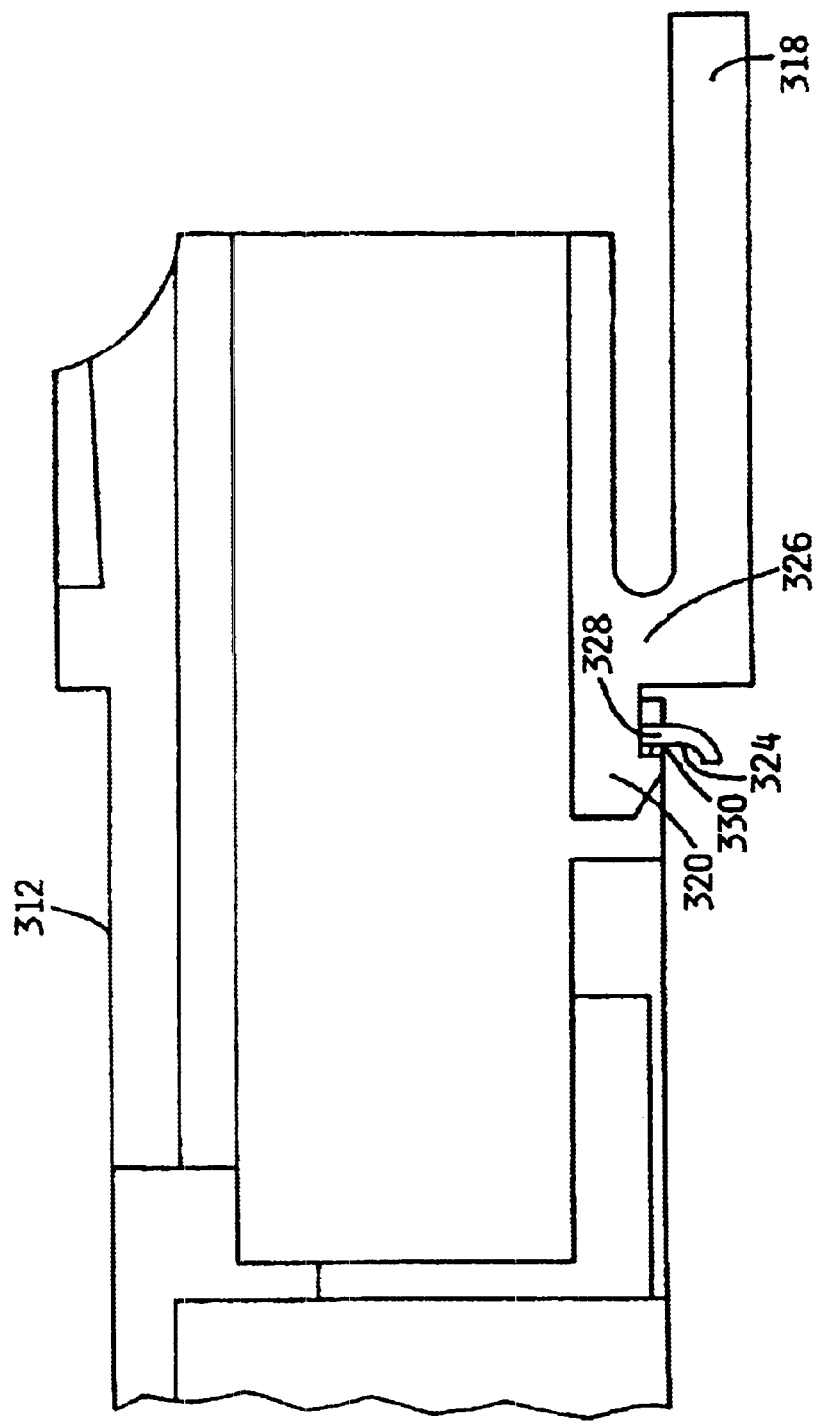
FIG. 17 is a section view of the transceiver module and the latch member of FIG. 16.

Refer now to FIGS. 16, 17, and 18, the shaft 30 and 130 of the above described embodiments are replaced with a web or living hinge 326 of material interconnecting the transceiver module 312 with the latch hook 320 and latch tab 318. The web or living hinge 326 flexes and permits movement of the latch hook 320 responsive to the manual movement of the latch tab 318 to move the latch surface 330 relative to the latching surface 324 on the latch bar 328 guide rail system to which the transceiver module 312 is mated.

If the latch member 322 is fabricated separately from the transceiver module 312, as in FIG. 18, it may be inserted into a receiving cavity 314 of the transceiver module 312 and removed for replacement if any portion of the latch member 322 becomes inoperative through breakage or damage. The latch member 322 may be provided with a mounting structure 336 that will slide into and fit within a complementary mounting recess 314 on the transceiver module 312 and may rely on friction, detents or other well-known retaining structures to hold the mounting structure 336 of latch member 322 in the mounting recess 314 of the transceiver module 312.

Figure 19:
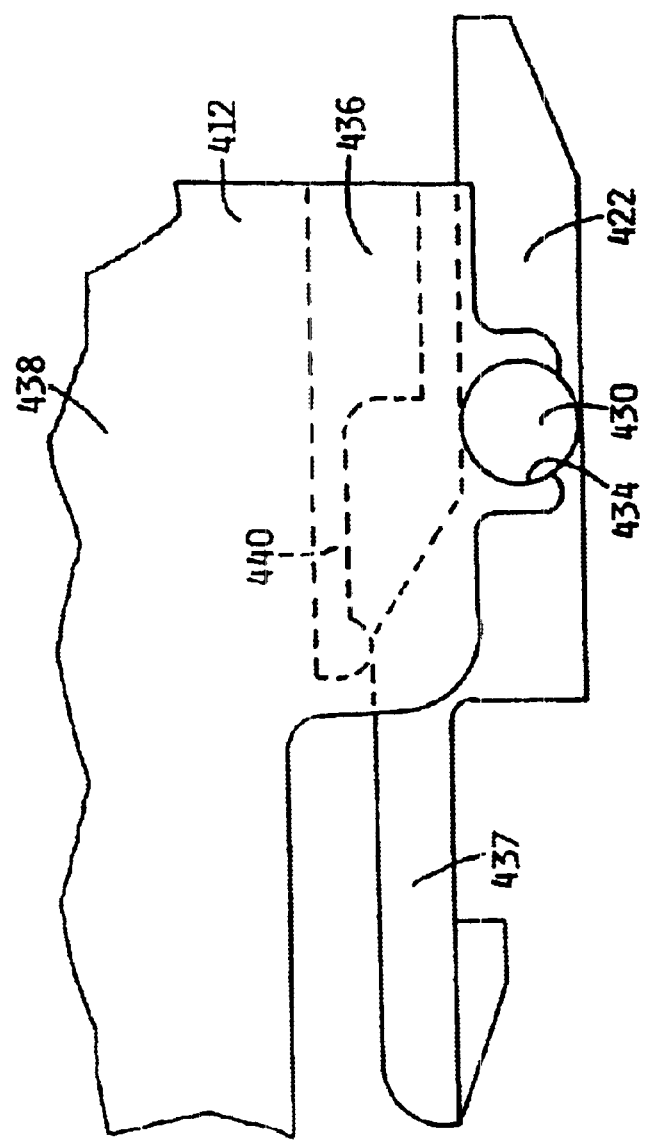
FIG. 19 is a side view of a portion of a transceiver module and a further embodiment of the latch member carried thereby.

Reference is now made to a further embodiment of the latch mechanism in FIG. 19 where transceiver module 412 accepts into integral journal 434, shaft 430 of latch member 422. Transceiver module 412 is typically molded of plastic and incorporates cross member 436 extending between side walls 438 of the transceiver module 412. Integrally molded with cross member 436 is at least one and preferably two cantilevered restore members 440. Restore members 440 are deflectable and act as beam springs resisting clockwise pivoting movement of latch member 422. As restore members 440 restore to an undeflected state, latch arm 437 is biased into a latching position to engage a latch bar such as latch beam 208 and latch surface 212 in FIG. 13.

FIG. 20 illustrates the cross member 436 extending between side walls 438 of transceiver module 412. Supported on cross member 436 is a pair of restore members 440. The distal ends 442 of restore members 440 are formed to provide bearing engagement surfaces 444, which engage latch member 422 as shown in FIG. 19.

Latching members 22, 122, 222, 322, 422 disclosed herein not only provide retention of the transceiver module 12, 112, 312, 412 within communication port 14, 114 but provide a controlled level of retention force determined by the size and material characteristics of latch arms 36, 136 and latch hook 320. Latch 22, 122, 312 may provide 40–60 Newtons of force resisting disconnection, thus preventing transceiver modules from being inadvertently disconnected if pulled or pulled as if a cable is tripped on while it is plugged into a transceiver module 12. If the retaining capability of the latch member 22, 122, 322, 422 is exceeded and the latch arm 36, 136, 437 or latch hook 320 is broken or deformed to the extent that it cannot retain the transceiver module 12, 112, 312 in communication port 14, 114, 206, the latch 22, 122, 222, 322, 422 may be easily replaced by removal of the damaged latch 22, 122, 222, 322, 422 from the transceiver module 12, 112, 412 and a new latch 22, 122, 222, 322, 422 installed in its place.

As one of skill in the art will recognize, other minor modifications to the latching system disclosed herein may be made without removing the modified latching systems from the scope of protection provided by the attached claims which define the scope of the patent protection afforded the latching system.

We claim:

1. A latch mechanism for attaching an electronic or opto-electronic module, of the type including a pair of journal bearings, to an electronic interface member, comprising:

a shaft for mounting in said bearings;

a manually engageable lever extending from said shaft in a first plane parallel to an axis of said shaft;

a latch hook support comprising an offset section extending from said shaft, and a planar section in a second plane parallel to said axis of said shaft;

a latch hook formed on said latch hook support and engageable with a latching surface on a latch bar, said latch hook disposed with an outer free end thereof directed to said first plane; and a resilient member extending from said module between said latch mechanism and said module, whereby said resilient member may be deformed upon movement of said latch mechanism relative to said bearing to provide a restore force to said latch mechanism;

wherein said shaft extends beyond said lever and said latch hook support; and wherein said latch mechanism is rigid and said bearings have an opening, thereby allowing said shaft to be forced into or removed from said bearings, whereby said manually engageable lever is movable relative to said electronic module to engage said latch hook with and disengage said latch hook from said latching surface.

2. The latch mechanism of claim 1, further comprising a camming surface on a distal end of said latch hook support and said latch hook, which is depressed to displace said latch mechanism about said axis upon passage thereby of a latch bar, deflecting said resilient member.

3. The latch mechanism of claim 1, wherein said latch hook support comprises surfaces engageable with removable elements mateable with said module, whereby said removable elements must be removed to permit displacement of said latch mechanism to release said module for removal.

4. The latch mechanism of claim 1, wherein said latch hook comprises a generally triangular shaped body with one edge thereof forming a surface disposed transverse to said latch hook, said surface engageable with said latch bar.

5. The latch mechanism of claim 4, wherein a portion of said generally triangular shaped body opposed to said surface is inclined relative to said latch hook, thereby forming a camming surface for engaging said latch bar and camming said latch hook out of a path of said latch bar.

6. An electronic or an opto-electronic module connectable to an electronic interface member of an electronic system housing, which includes a latch bar, comprising:

a supporting chassis including journal bearings;

a latch mechanism comprising:

a pivot structure mounted in said journal bearings;

a manually engageable lever extending from said pivot structure in a first plane parallel to an axis of said pivot structure;

a latch hook support comprising: an offset section extending from said pivot structure, and a planar section in a second plane parallel to said axis of said pivot structure; and a latch hook formed on said latch hook support and engageable with a latching surface on said latch bar, said latch hook disposed with an outer free end thereof directed to said first plane; and a resilient member extending between said latch mechanism and said electronic module, whereby said resilient member may be deformed upon movement of said latch mechanism relative to said bearings to provide a restore force to said latch mechanism;

wherein said latch mechanism is rigid and said bearings have an opening, thereby allowing said pivot structure to be forced into or removed from said bearings, whereby said manually engageable lever is movable relative to said supporting chassis to engage said latch hook with and disengage said latch hook from said latching surface.

7. The module of claim 6, further comprising a camming surface on a distal end of said latch hook support and said latch hook, which is depressed to displace said latch mechanism about said axis of said shaft upon passage thereby of said latch bar, deflecting said resilient member.

8. The module of claim 6, wherein said resilient member projects from a portion of said latch hook support distal from said shaft.

9. The module of claim 6, wherein said latch hook support comprises surfaces engageable with removable elements mateable with said module, whereby said removable elements must be removed to permit displacement of said latch mechanism to release said module for removal.

10. The latch mechanism of claim 9, wherein the removable elements comprise optical couplers; and wherein the surfaces of the latch hook support comprise camming surfaces engageable by the optical couplers to prevent the latch hook from disengaging the latching surface.

11. A transceiver module connectable to an electronic interface member of an electronic system housing, which includes a latch bar, comprising:

a supporting chassis including bearings, each accessible through an opening in a side thereof;

a sacrificial latch mechanism comprising:

pivot means removably mounted through the openings in said bearings for rotation along an axis of said pivot means;

a tab extending on one side of said pivot means in a first plane parallel to said axis for actuating said latch mechanism;

a latch arm extending from an opposite side of said pivot means comprising: an offset segment extending from said tab into a cavity in said supporting chassis, and a distal segment disposed in the cavity in a second plane parallel to said first plane; and a latch hook extending from said latch arm and engageable with said latch bar, said latch hook disposed with an outer free end thereof directed to said first plane; and a resilient member extending between said latch mechanism and said supporting chassis, said resilient member deformable upon rotation of said latch mechanism relative to said bearings to provide a restore force to said latch mechanism;

whereby said tab is movable relative to said supporting chassis to engage said latch hook with or disengage said latch hook from said latch bar.

12. The transceiver module according to claim 11, further comprising a first camming surface on a distal end of said latch hook for engaging said latch bar causing rotation of said latch mechanism to enable the latch hook to pass over the latch bar prior to engagement therewith.

13. The transceiver module according to claim 11, wherein the support chassis includes openings for receiving optical cable connectors; and wherein the latch arm further comprises a second camming surface extending into said openings for engaging said optical cable connectors, thereby preventing rotation of said latch mechanism while optical cable connectors are present in the openings.

14. The transceiver module according to claim 11, wherein said latch hook comprises a generally triangular shaped body with one edge thereof forming a surface disposed transverse to said latch hook, said surface engageable with said latch bar.

15. The transceiver module according to claim 11, wherein a portion of said generally triangular shaped body opposed to said surface is inclined relative to said latch hook, thereby forming a camming surface for engaging said latch bar and camming said latch hook out of a path of said latch bar.

16. The transceiver module according to claim 11, wherein the resilient member extends from the latch arm.

17. The transceiver module according to claim 11, wherein the resilient member extends from the supporting chassis.

18. The transceiver module according to claim 17, wherein the resilient member comprises a beam spring extending parallel to the first and second planes in an undeflected state.

19. The transceiver module according to claim 11, wherein the pivot means are snap-fit into the bearings.

* * * * *